(12) United States Patent
Jones et al.

(10) Patent No.: US 9,569,707 B2
(45) Date of Patent: Feb. 14, 2017

(54) METHOD AND APPARATUS PERTAINING TO RFID TAG TAG-TYPE IDENTIFIERS

(75) Inventors: Nicholaus A. Jones, Fayetteville, AR (US); Justin C. Lewis, Scotch Plains, NJ (US); John F. Neal, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 1099 days.

(21) Appl. No.: 13/442,472

(22) Filed: Apr. 9, 2012

(65) Prior Publication Data
US 2013/0265142 A1 Oct. 10, 2013

(51) Int. Cl.
*H04Q 5/22* (2006.01)
*G06K 17/00* (2006.01)

(52) U.S. Cl.
CPC ................ *G06K 17/0025* (2013.01)

(58) Field of Classification Search
None
See application file for complete search history.

(56) References Cited

U.S. PATENT DOCUMENTS 7,604,160 B2 * 10/2009 Imine et al. ............... 235/375
8,810,376 B1 * 8/2014 Picasso et al. .......... 340/10.52
2004/0193742 A1 * 9/2004 Ikeda ............................. 710/1
2005/0230479 A1 * 10/2005 Chapman et al. ....... 235/462.13
2007/0126578 A1 * 6/2007 Broussard ................. 340/572.1
2010/0271186 A1 * 10/2010 Tanaka et al. ............. 340/10.3

OTHER PUBLICATIONS

"EPC™ Radio-Frequency Identity Protocols Class-1 Generation-2 UHF RFID Protocol for Communications at 860 MHz-960 MHz Version 1.0.9;" Specification for RFID Air Interface by EPCglobal Inc.; 94 pages, Jan. 2005.

* cited by examiner

*Primary Examiner* — Curtis King
(74) *Attorney, Agent, or Firm* — Fitch, Even, Tabin & Flannery LLP

(57) ABSTRACT

An RFID tag includes a tag-type identifier. This tag-type identifier can represent data encoder-relevant tag-type information and/or printer-relevant tag-type information as desired. This identifier can comprise an optical or electronic code such as a numeric, binary, or hexadecimal code. This code can be stored within the RFID tag's integrated circuit (for example, within the integrated circuit's stored EPC field). These teachings also provide for recovering from an unassigned RFID tag its tag-type identifier and using that tag-type identifier to facilitate automatically processing the RFID tag when assigning the RFID tag to a corresponding item. This can comprise utilizing the tag-type identifier to determine corresponding assignment-facilitation information to use when assigning the RFID tag. Examples in these regards, include, for example, an RFID tag encoder power setting or position, a printer setting, or a label layout.

13 Claims, 3 Drawing Sheets

METHOD AND APPARATUS PERTAINING TO RFID TAG TAG-TYPE IDENTIFIERS

TECHNICAL FIELD

This invention relates generally to radio-frequency identification (RFID) tags.

BACKGROUND

RFID tags are known in the art. RFID tags typically include small circuits that are configured to respond to a radio-frequency (RF) signal with a corresponding data transmission. Some RFID tags are self-powered while others are passive in that they rely upon the received RF signal for their operating power (and some RFID tags are a hybrid of these two approaches). RFID tags can and do assume a wide variety of physical form factors as well a variety of circuit components and architecture. These variations reflect, for example, the need to best accommodate a wide variety of items to be tagged as well as anecdotal manufacturer's preferences in these regards.

Many times the RFID tag's data includes information, such as an identifier, that is unique (at least to some extent) to that particular responding RFID tag. The Electronic Product Code (EPC) as managed by EPCGlobal, Inc., for example, represents one such effort in these regards. EPC-based RFID tags each have an utterly unique serial number (within the EPC system) to thereby uniquely identify each tag and, by association, each item correlated on a one-to-one basis with such tags. (The corresponding document entitled EPC Radio-Frequency Identity Protocols Class-1 Generation-2 UHF RFID Protocol for Communications at 860 MHz-960 MHz Version 1.0.9 (often referred to as "EPC GEN2") is hereby fully incorporated herein by this reference.)

Nascent, unassigned RFID tags are often provided to an end user (such as a manufacturer or retailer) in a bulk format. This can comprise, for example, providing hundreds or even thousands of unassigned RFID tags in a continuous strip in a roll. In this case the end user singulates individual, assigned RFID tags as desired and applies them to a corresponding item being tagged.

Assigning an unassigned RFID tag, in turn, can comprise at least encoding the RFID tag with a unique identifier such as the aforementioned EPC. In many cases this assignment process can also include printing visual content on the RFID tag. This visual content can comprise, for example, text, images, optical codes (such as the well-known universal product code), and so forth as relates to the tagged item, the end user, or virtually any other point of context that one may wish.

As noted above, however, RFID tags vary widely from one another with respect to their physical and electrical types. These differences can lead to problems during the encoding and/or printing stages of the assignment process. Executing the wrong print file, for example, can result in producing assigned RFID tags that are unsuitable for their intended purpose. Even worse, configuring an RFID tag encoder improperly can not only result in failing to encode a given RFID tag but can even result in improperly encoding other RFID tags besides a target RFID tag. In many cases there is little information available to help an attendant understand when an erroneous assignment activity is staged to occur.

BRIEF DESCRIPTION OF THE DRAWINGS

The above needs are at least partially met through provision of the method and apparatus pertaining to RFID tag tag-type identifiers described in the following detailed description, particularly when studied in conjunction with the drawings, wherein.

Figure 1:
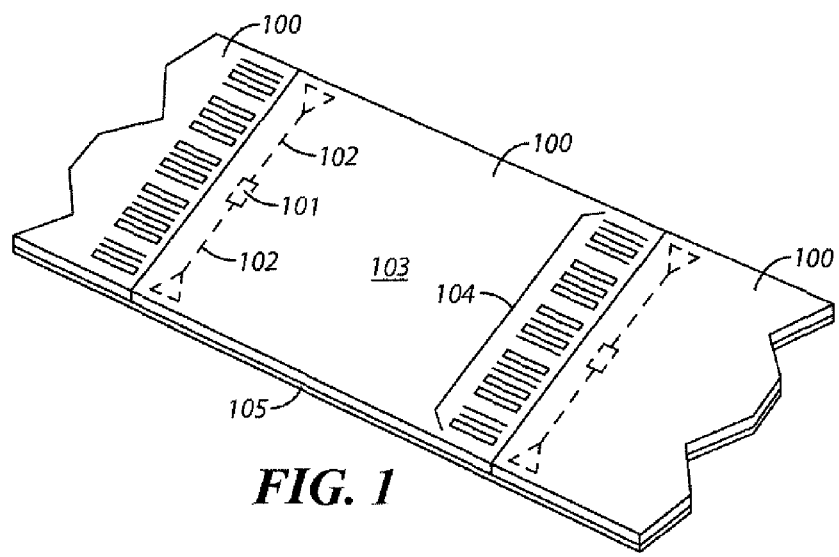
FIG. 1 comprises a perspective view as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an RFID tag includes a tag-type identifier. This tag-type identifier can represent, for example, data encoder-relevant tag-type information and/or printer-relevant tag-type information as desired. By one approach this tag-type identifier can comprise an optical or electronic code such as, but not limited to, a numeric code, a binary code, or a hexadecimal code. By one approach this code is stored within the RFID tag's integrated circuit (for example, within the integrated circuit's stored EPC field).

So configured, these teachings provide for recovering from an unassigned RFID tag its corresponding tag-type identifier and using that tag-type identifier to facilitate automatically processing the RFID tag when assigning the RFID tag to a corresponding item. By one approach, this use of the tag-type identifier can comprise utilizing the tag-type identifier to determine corresponding assignment-facilitation information to use when assigning the RFID tag. Examples in these regards, include, for example, an RFID tag encoder power setting or position, a printer setting, a label layout, and so forth.

If desired, these teachings will also accommodate using the tag-type identifier to provide a notice to an assignment attendant regarding a mismatch between current assignment-related encoder and/or printer settings and the RFID tag type. Such a notice can include, for example, audible alerts as well as visual content such as a displayed warning or cautionary notice.

So configured, information regarding the type of RFID tag that is undergoing assignment involving encoding and/or printing can be automatically gleaned directly from the RFID tag itself and utilized to determine whether the presently-selected assignment parameters are, in fact, suitable and appropriate. Such information can be readily leveraged in a variety of ways to help ensure a high assignment-process yield and a minimization of waste.

These teachings are highly flexible in practice and can be implemented in as distributed or as consolidated a manner as may best suit the needs and/or possibilities of a given application setting. For example, by one approach the assignment platform can comprise an integrated station that not only encodes the RFID tag and prints desired text thereon but that also takes in the RFID tag's tag-type identifier and uses that identifier to access a local store of information (such as a look-up table, a relational database, or other memory-store of choice) to assess whether the present assignment parameters make sense in view of the RFID tag's type. By another approach, however, such an assignment platform may forward that tag-type identifier to a remote host that makes (or contributes to) the aforementioned determination. Numerous other possibilities exist in these same regards as well.

The concepts set forth herein can be readily scaled to accommodate a wide variety of assignment parameters and circumstances and essentially any number of RFID-tag types. Those skilled in the art will appreciate that these teachings can be effectively and reliably implemented in a cost-effective manner.

These and other benefits may become clearer upon making a thorough review and study of the following detailed description. Referring now to the drawings, and in particular to FIG. 1, an illustrative RFID tag 100 that is compatible with many of these teachings will first be presented.

This RFID tag 100 includes a tag body 103 that supports both an integrated circuit 101 and a corresponding antenna 102 (in this illustrative example, a dipole antenna). Here, for the sake of example, the tag body 103 comprises a paper rectangle having an adhesive backing and a removable backing paper 105 that an end user can remove to expose the adhesive backing to facilitate adhering the RFID tag 100 to a given item. The rectangular shape and paper constituency of the tag body 103 is merely suggestive of one form factor with essentially any shape and suitable material being available for use as desired.

The integrated circuit 101 comprises a control circuit, memory, rectifier, modulator and demodulator, and other circuitry components. These components and their corresponding architecture comprise a well understood area of endeavor. As the present teachings are not overly sensitive to any particular choices in these regards, for the sake of simplicity further details in these regards will not be provided here except to note that the functionality of the integrated circuit 101 in this example presumes compatible interoperability with the aforementioned EPC GEN2 RFID standard. Accordingly, this integrated circuit 101 includes a memory field to store a corresponding assigned electronic product code. Typically, however, this EPC memory field does not contain an actual EPC prior to the RFID tag 100 being assigned to correspond to a particular corresponding item.

In this particular illustrative example the tag body 103 of the RFID tag 100 attaches at opposing ends to adjacent RFID tags 100. Those adjacent RFID tags 100, in turn, similarly connect to other RFID tags (not shown) to form a strip of as many RFID tags 100 as may be desired. This can comprise, for example, many hundreds or even many thousands of such RFID tags. In a typical case such a strip will be formed into a roll that will readily permit the RFID tags 100 to be selectively separated one at a time from a leading edge of the unspooling strip. If desired, perforations, scoring, or the like can be used to make it easier to separate adjacent RFID tags 100 from another. These teachings will accommodate other approaches in these regards, however. For example, a cutting implement can be readily employed to singulate one RFID tag 100 from another.

Figure 2:
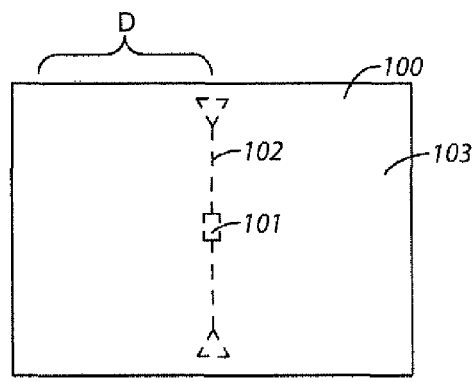
FIG. 2 comprises a top plan view as configured in accordance with various embodiments of the invention.

As noted above, there are various types of RFID tags. One RFID tag that is otherwise electrically similar (or even identical) to another RFID tag may nevertheless have, for example, a very different form factor, relative size, or material constituency. Or, two RFID tags may have tag bodies that are physically identical to one another but which may have very different electrical/active components, component placement, circuitry, or the like. As but one simple example in these regards, the RFID tag 100 shown in FIG. 1 has its integrated circuit 101 and antenna 102 located proximal to one end thereof while the RFID tag 100 illustrated in FIG. 2 is physically identical but has its integrated circuit 101 and antenna 102 (which are also identical to the components used in FIG. 1's example) located proximal the middle of the tag body 103 instead of near an end of the tag body 103. As a result, the circuitry of the RFID tag 100 shown in FIG. 2 is displaced by an amount "D" from the circuitry of the RFID tag 100 shown in FIG. 1. All of these differences and more can comprise a justifiable basis for characterizing a given RFID tag 100 as being a given "type" of tag.

Referring again to FIG. 1, this RFID tag 100 includes a tag-type identifier that corresponds to this RFID tag's type. By one approach, for example, this tag-type identifier can represent one or both of data encoder-relevant tag-type information and printer-relevant tag-type information. These teachings are highly flexible in practice. For example, the tag-type identifier can itself constitute a detailed catalog of the tag-type information and hence can be as parametrically and/or dimensionally specific as one might wish. By another example, however, the tag-type identifier can be more representational in nature. As a very simple example in the latter regards, in an application setting where the end user uses only two types of RFID tags, a hang tag and an adhesive tag, it can be fully sufficient if the tag-type identifier simply identifies whether the RFID tag is the one or the other. By knowing that the RFID tag is, for example, the adhesive tag, the assignment system can be fully apprised of all it needs to know with respect to properly encoding and printing that particular RFID tag.

In any event, this tag-type identifier is in fact a discrete identifier and hence not a merely observed physical characteristic of a tag (such as a length or width of the tag) from which one might hope to deduce something about the tag. It will also be understood that the tag-type identifier identifies the type of the tag itself and not merely one of its components. Accordingly, the tag-type identifier is not a mere component identifier as some integrated circuits are able to provide for themselves.

Data encoder-relevant tag-type information comprises information that an RFID tag encoder can utilize when encoding the corresponding RFID tag. Such information can comprise, for example, one or more parameters that specify a particular encoding transmission power level or that can be used to determine that power level. As another example, such information can comprise one or more parameters that specify a particular position (in absolute terms or in relative terms) for the encoder or some operative encoder component (such as a transmitting antenna) with respect to the RFID tag when writing to that RFID tag as part of the assignment process.

Printer-relevant tag-type information, in turn, comprises information that an RFID tag printer can utilize when printing on the corresponding RFID tag. Such information can comprise, for example, information that specifies (or that can serve to help specify) a particular printer setting or parameter (such as a color or grayscale selection, reduction or enlargement factor, margin(s), font selection, resolution, brightness, contrast, or other print file parameter), label layout, or the like.

This tag-type indicator can comprise, by one approach, one or more codes such as, but not limited to, a numeric code, a binary code, and/or a hexadecimal code of desired length. By one approach this code (or codes) is stored within the aforementioned integrated circuit 101. For example, the code can be stored within the integrated circuit's aforementioned EPC field. (In the latter case, it will be understood that these teachings do not presume that an EPC will, in and of itself, also serve as such a tag-type indicator. Instead, though it is possible that a given tag-type indicator may have a same number of digits as an EPC and otherwise appear as an EPC, the tag-type indicator is not, per se, an EPC within the context and assignment scheme of the EPC GEN2 standard.)

These teachings will readily accommodate using a single tag-type indicator to fully characterize a given type of RFID tag 100 if desired. Using this approach, for example, a given RFID tag's type for both encoding and printing purposes is represented by that tag's tag-type indicator. These teachings will also accommodate other practices in these regards, however. For example, a first tag-type indicator can serve to characterize the RFID tag 100 for printing purposes while a second tag-type indicator could serve to characterize the RFID tag 100 for encoding purposes.

In lieu of an electrically-stored tag-type indicator as described above (or in combination therewith), these teachings will accommodate using an optical code 104 that appears, for example, on the tag body 103. A wide variety of optical codes are known in the art including both one-dimensional and two-dimensional optical codes. As the present teachings are not overly sensitive to the selection of any particular approach in these regards, for the sake of brevity further elaboration in these regards will not be presented here.

According, these teachings provide an RFID tag 100 having a tag body 103 that supports an integrated circuit 101, a corresponding antenna 102, and a tag-type identifier. Presuming this to be the case, and referring now to FIG. 3, a corresponding process 300 provides at step 301 for recovering that tag-type identifier from a given unassigned RFID tag. This can comprise, for example, recovering this indicator for a next RFID tag 100 in a roll or strip of RFID tags 100 that enters, or that is poised to enter, a given assignment stage/platform.

Figure 4:
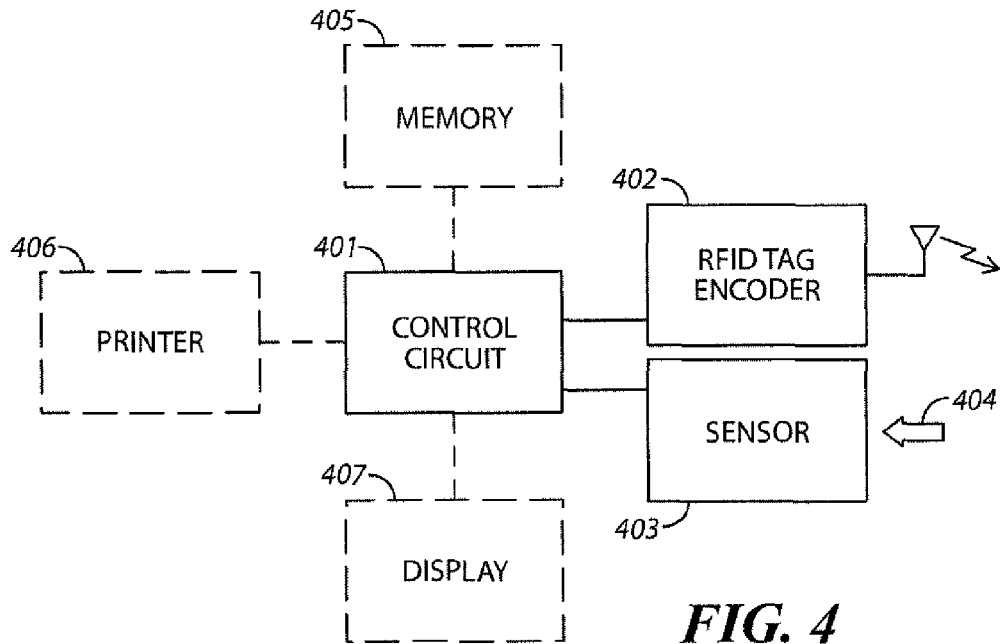
FIG. 4 comprises a block diagram as configured in accordance with various embodiments of the invention.

As one illustrative example in these regards, FIG. 4 depicts an assignment platform having a control circuit 401 that operably couples to both an RFID tag encoder 402 (to write, for example, an assigned EPC code to a particular RFID tag 100) and a sensor 403 that senses/reads a given RFID tag's tag-type identifier 404. Such a control circuit 401 can comprise a fixed-purpose hard-wired platform or can comprise a partially or wholly programmable platform. These architectural options are well known and understood in the art and require no further description here.

When the tag-type identifier 404 comprises an optical code, this sensor 404 can comprise an optical code reader. When the tag-type identifier 404 comprises an electrically-stored code in the RFID tag's integrated circuit 101, this sensor 404 can comprise an RFID tag reader. So configured, the assignment platform can recover the tag-type identifier(s) for a given unassigned RFID tag 100 at an appropriate time of need.

Figure 3:
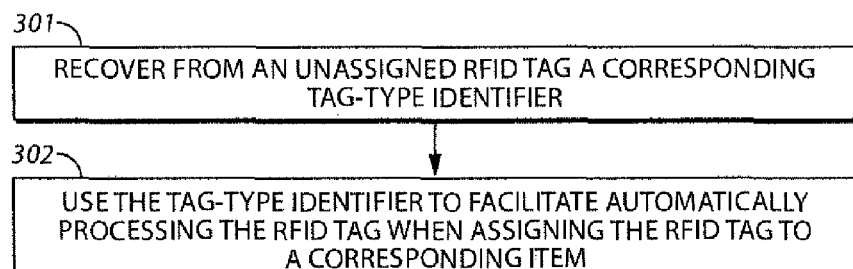
FIG. 3 comprises a flow diagram as configured in accordance with various embodiments of the invention.

Referring still to both FIGS. 3 and 4, at step 302 this process 300 then provides for using that recovered tag-type identifier to facilitate automatically processing the RFID tag 100 when assigning the RFID tag to a corresponding item. As used herein, this reference to "item" will be understood to refer to a broad category of taggable possibilities including but not limited to products, locations, shipping containers, or assets in general, to note but a few examples in these regards. Also as used herein, this reference to "assigning" will be understood to not necessarily refer to merely correlating (for example, in a database) the RFID tag/item with a specific corresponding unique identifier (such as, but not limited to, an EPC) but rather to the literal act of encoding the RFID tag 100 with a given unique identifier (such as, but not limited to, an EPC) and/or to the literal act of printing content on the tag body 103 of the RFID tag 100.

In this example, this step 302 can include the control circuit 401 using that recovered tag-type indicator to access a local store of information (as stored, for example, in a local memory 405 that also operably couples to the control circuit 401) to obtain additional information to, for example, interpret the meaning of that tag-type indicator and/or to obtain corresponding assignment-facilitation information (as described above, for example) to use when assigning the RFID tag 100 that provided the tag-type indicator. This recovered information can then be used, for example, to ensure appropriate settings for the RFID tag encoder 402 when encoding this RFID tag 100 and/or for an optional printer 406 that the control circuit 401 may influence or control when printing content on the RFID tag 100.

This step 302 can serve in other regards too, however, as desired. As one example, if the control circuit 401 should determine there to be a mismatch between the parameters of a current assignment process and the RFID tag's type, the control circuit 401 can provide a corresponding warning via, for example, a display 407 that operably couples to the control circuit 401. As a simple illustrative example, an assignment attendant may have configured the assignment platform to assign an RFID tag having a hang-tag form factor but where the recovered tag-type indicator reveals the current RFID tag to be a self-adhesive-type of RFID tag instead. In this case, the control circuit 401 could halt the assignment process and provide a textual or icon-based warning on the display 407 to advise the attendant of this disparity between the task as defined and the available RFID-tag stock. If desired, the control circuit 401 could also provide an override opportunity via that display 407 to permit the attendant to carry forward with the present assignment activity as specified notwithstanding the apparent mismatch.

In the example of FIG. 4, the assignment platform (be it an encoder, a printer, or a combination encoder/printer) has a local and native ability and resources to both recover the tag-type identifier from the RFID tag 100 and to use that identifier without a need for further resources to control various encoding specifications (such as transmission power) and/or printing specifications, and/or to determine mismatches between current assignment-related settings and the RFID tag type. These teachings will readily accommodate other practices in these regards, however.

Figure 5:
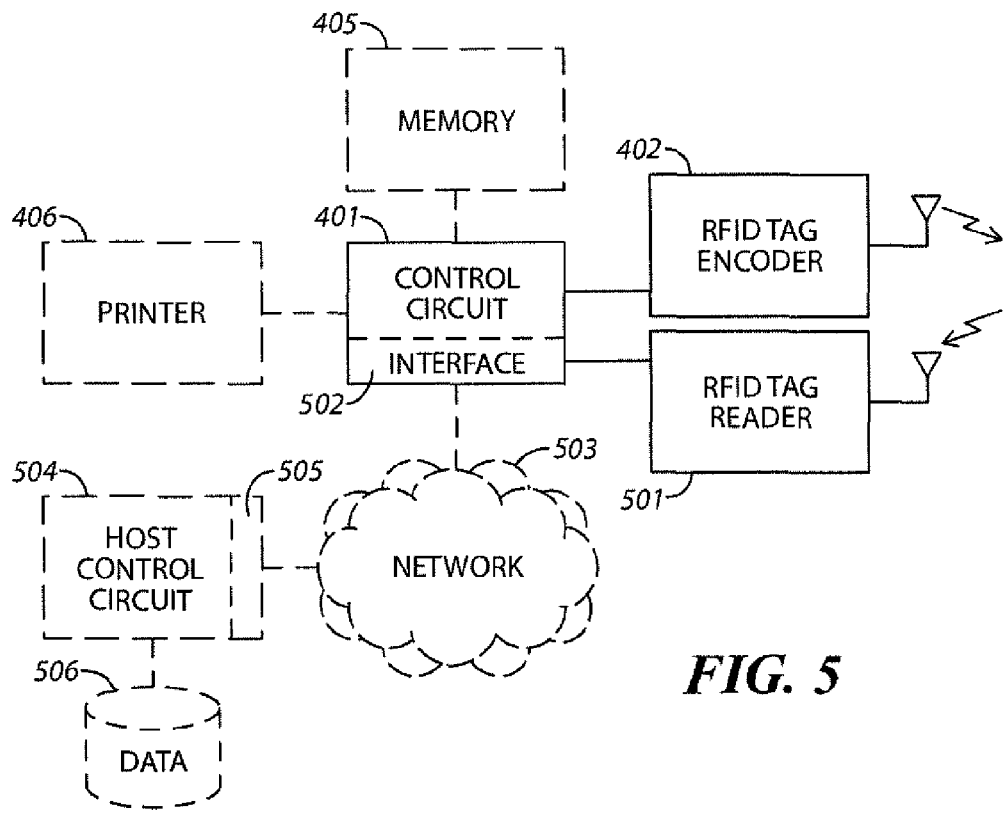
FIG. 5 comprises a block diagram as configured in accordance with various embodiments of the invention.

FIG. 5, for example, illustrates having the control circuit 401 of the assignment platform couple via its own network interface 502 and one or more intervening data communication networks 503 to a remotely-located host control circuit 504 via its network interface 505. (This reference to "remotely" will be understood to refer to a significant physical separation as when the remote resource is physically located in another physically-separate facility, metropolitan area, or even country as compared to the assignment platform.) Of course, these teachings will also readily accommodate connecting in a similar manner to a separate host control circuit that is not "remote" but which nevertheless constitutes a separate physical and logical entity as regards the control circuit 401 of the assignment platform.

In this case, a tag-type identifier (as read, for example, by an RFID tag reader 501) can be passed, as-is or in some modified form, via the control circuit's network interface 502 to the host control circuit 504. The latter, in turn, can use this tag-type identifier (and such other information as the assignment platform may also provide in a given application setting) to access, for example, an available data base 506 to again determine corresponding assignment-facilitation information for the assignment platform to use when assigning this particular RFID tag (and/or to determine when a mismatch between an expected task and the RFID tag type exists). The host control circuit 504 can then utilize its own network interface 505 to transmit that assignment-facilitation information (and/or mismatch information) to the assignment platform that comprises the assignment-facilitation apparatus.

The foregoing examples are intended only to serve an illustrative purpose and are not intended to express any limitations with respect to the scope or scale of these teachings. In fact, the disclosed concepts can be practiced using any of a variety of enabling approaches.

Figure 6:
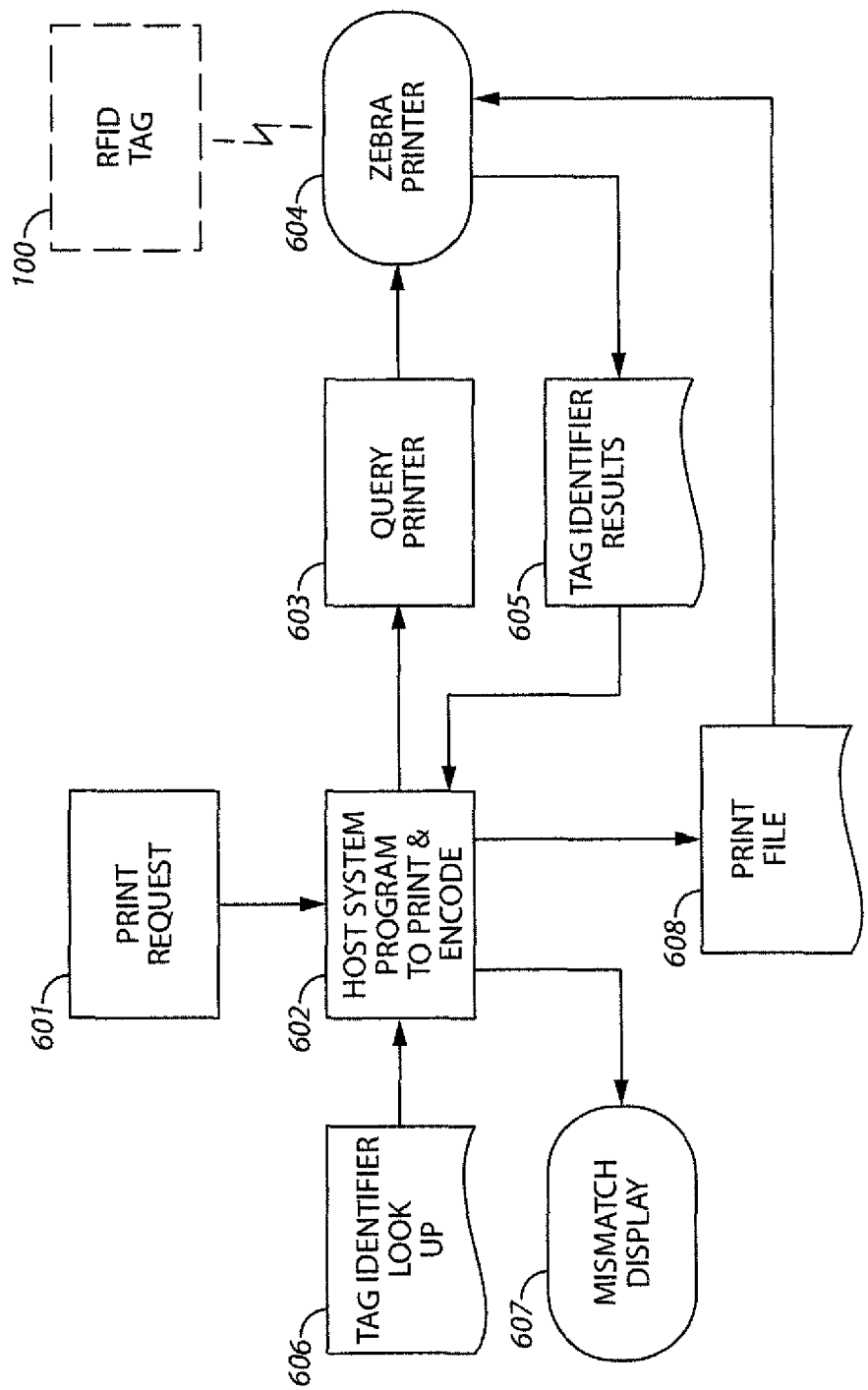
FIG. 6 comprises a flow diagram as configured in accordance with various embodiments of the invention.

The same holds true for the following example that offers, again for the sake of illustration, numerous specific details regarding one particular way by which these teachings can be employed and leveraged. In this particular example, and referring now to FIG. 6, the assignment printer comprises a portable device that communicates wirelessly with a remote (or at least physically-discrete) host as needed to acquire information to further the assignment process for a given RFID tag.

When an attendant and/or a backend process requests 601 that a given RFID tag 100 be printed, a print program 602 at the host receives the request. This request 601 include information regarding a corresponding required, expected, and/or designated type of RFID tag. The host program 602 queries 603 the printer 604 (which comprises, in this example, an RFID printer as offered, for example, by Zebra Technologies) for tag-type identifier from the RFID tag 100. The printer 604 returns those tag-type identifier results 605 to the host. The host program 602 then accesses a tag identifier lookup file or database 606 and determine if there is a mismatch between expectations and reality.

In the event of a mismatch, the host program 602 so notifies the user through a display 607. (Or, in case where a backend process sources the original print request 601, an automated decision can be used instead.) The host program 602 also then sends the correct printer file 608 to the printer 604 based on the user/backend process information and/or any changes that might otherwise be necessary based on the tag-type identifier.

So configured, RFID tags of any of a wide variety of types can be readily and reliably used in an application setting characterized by relatively inexperienced assignment attendants. These teachings can be readily implemented with little or no incremental cost and can significantly aid in avoiding undue wastage of RFID tags and/or delayed assigning and tagging.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one example in these regards, if desired the RFID tag could include (in lieu of the foregoing or in combination therewith) an application-type identifier that the assignment process could similarly recover and utilize to determine what substantive content to print on a given RFID tag. Using this approach, for example, an RFID tag could pre-ordain (or at least suggest) its encoded/printed use in a very particular assigned manner.

We claim:

1. A radio-frequency identification tag comprising:
   a tag body;
   an integrated circuit supported by the tag body;
   an antenna operably coupled to the integrated circuit and supported by the tag body; and
   a tag-type identifier that comprises at least one of a numeric code, a binary code, and a hexadecimal code that represents at least one of:
   data encoder-relevant tag-type information; and
   printer-relevant tag-type information;
   wherein the code is stored within an electronic product code (EPC) field per EPC Radio-Frequency Identity Protocols Class-1 Generation-2 UHF RFID Protocol for Communications at 860 MHz-960 MHz Version 1.0.9, the tag-type identifier being supported by the tag body;
   such that a control circuit uses the tag-type identifier to control at least one printing parameter to be employed by a printer when printing on the radio-frequency identification tag.

2. The radio-frequency identification tag of claim 1 wherein the tag-type identifier is stored within the integrated circuit.

3. An apparatus comprising:
   a radio-frequency identification tag encoder;
   a radio-frequency identification tag reader; and
   a control circuit operably coupled to the radio-frequency identification tag reader and the radio-frequency identification tag encoder and configured to use the radio-frequency identification tag reader to;
   read a tag-type identifier as corresponds to and as provided by a particular radio-frequency identification tag, wherein the tag-type identifier is a code that comprises at least one of a numeric code, a binary code, and a hexadecimal code and is stored by the radio-frequency identification tag within an electronic product code (EPC) field per EPC Radio-Frequency Identity Protocols Class-1 Generation-2 UHF RFID Protocol for Communications at 860 MHz-960 MHz Version 1.0.9, and wherein the tag-type identifier representing represents at least one of:
   data encoder-relevant tag-type information; and
   printer-relevant tag-type information; and
   use the tag-type identifier to control use of the radio-frequency identification tag encoder when encoding the particular radio-frequency identification tag by, at least in part, controlling a transmission power to employ when encoding the particular radio-frequency identification tag.

4. The apparatus of claim 3 wherein the control circuit is further configured to use the radio-frequency identification tag encoder to overwrite the code by writing an EPC to the EPC field.

5. The apparatus of claim 3 wherein the control circuit is further configured to use the tag-type identifier to control use of the radio-frequency identification tag encoder when encoding the particular radio-frequency identification tag by, at least in part, interacting with a host platform by providing information corresponding to the tag-type identifier and receiving information from the host platform regarding controlling the use of the radio-frequency identification tag encoder when encoding the particular radio-frequency identification tag.

6. The apparatus of claim 3 wherein the apparatus further comprises:
a printer;
and wherein the control circuit is further configured to use the tag-type identifier to control at least one printing parameter to be employed by the printer when printing on the radio-frequency identification tag.

7. A method comprising:
recovering from an unassigned radio-frequency identification tag a corresponding tag-type identifier from an electronic product code (EPC) field per EPC Radio-Frequency Identity Protocols Class-1 Generation-2 UHF RFID Protocol for Communications at 860 MHz-960 MHz Version 1.0.9 that represents at least one of:
data encoder-relevant tag-type information; and
printer-relevant tag-type information; and
using the tag-type identifier to facilitate automatically processing the radio-frequency identification tag when assigning the radio-frequency identification tag to a corresponding item by, at least in part, controlling at least one printing parameter to be employed by a printer when printing on the radio-frequency identification tag.

8. The method of claim 7 wherein using the tag-type identifier to facilitate automatically processing the radio-frequency identification tag when assigning the radio-frequency identification tag to a corresponding item further comprises, at least in part, controlling a transmission power to employ when encoding the radio-frequency identification tag.

9. The method of claim 7 wherein using the tag-type identifier to facilitate automatically processing the radio-frequency identification tag when assigning the radio-frequency identification tag to a corresponding item comprises, at least in part, providing a notice regarding a mismatch between current assignment-related settings and the radio-frequency identification tag type.

10. The method of claim 9 wherein the current assignment-related settings include at least one of:
a radio-frequency identification encoder power setting;
a radio-frequency identification encoder position;
a printer setting; and
a label layout.

11. The method of claim 9 wherein providing a notice comprises, at least in part, displaying the notice on a display.

12. An apparatus comprising:
a network interface;
a control circuit operably coupled to the network interface and configured to:
via the network interface receive a tag-type identifier from an electronic product code (EPC) field per EPC Radio-Frequency Identity Protocols Class-1 Generation-2 UHF RFID Protocol for Communications at 860 MHz-960 MHz Version 1.0.9 as corresponds to a given radio-frequency identification tag, the tag-type identifier representing at least one of:
data encoder-relevant tag-type information; and
printer-relevant tag-type information;
utilize the tag-type identifier to determine corresponding assignment-facilitation information to use when assigning the radio-frequency identification tag, the assignment-facilitation information comprising at least one of:
a radio-frequency identification encoder power setting;
a radio-frequency identification encoder position;
a printer setting; and
a label layout; and
transmit via the network interface the assignment-facilitation information to an assignment-facilitation apparatus.

13. The apparatus of claim 12 wherein the assignment-facilitation information comprises at least two of:
the radio-frequency identification encoder power setting;
the radio-frequency identification encoder position;
the printer setting; and
the label layout.

* * * * *